United States Patent [19]

Buczek et al.

[11] Patent Number: 4,475,812

[45] Date of Patent: Oct. 9, 1984

[54] CAVITY COUPLED OPTICAL CONDITION SENSOR

[75] Inventors: Carl J. Buczek, Encinitas, Calif.; Ronald E. Belek, Coventry, Conn.

[73] Assignee: The United States of America as represented by the Secretary of the Navy, Washington, D.C.

[21] Appl. No.: 307,356

[22] Filed: Sep. 30, 1981

Related U.S. Application Data

[63] Continuation-in-part of Ser. No. 138,623, Apr. 8, 1980, abandoned.

[51] Int. Cl.³ .................. G01B 11/16; G01B 9/02
[52] U.S. Cl. ............................. 356/32; 73/800; 356/349
[58] Field of Search .................. 356/32–35, 356/73.1, 32.5, 349; 372/92, 99, 97; 73/655–657, 705, 800, 653, 432 L

[56] References Cited

U.S. PATENT DOCUMENTS

| 3,326,078 | 6/1967 | Clarke et al. | 73/655 |
| 3,327,584 | 6/1967 | Kissinger | 356/375 |
| 3,395,606 | 8/1968 | Neill | 356/349 |
| 3,786,681 | 1/1974 | Kiehn | 356/33 |
| 3,808,557 | 4/1974 | Smiley | 356/349 |
| 4,140,393 | 2/1979 | Cetas | 356/43 |

OTHER PUBLICATIONS

Wiesemann, W., "Longitudinal Mode Selection in Lasers with Three Mirror Reflectors", App. Optics, 12-1973, pp. 2909-2912.

Smith, P. W., "Mode Selection in Lasers", Proc. IEEE, 4-1972, pp. 422, 428-429.

Kleinman et al., "Discrimination Against Unwanted Orders in the Fabry-Perot Resonator", Bell Sys. Tech. Jr., 3-1962, pp. 453-463.

Glatzel et al., "Temperature Measurement Technique Using Fresnel Interference Technique", IBM Tech. Disc. Bull., 4-1978, pp. 4571-4572.

Fiqueroa et al., "Characteristics of (GaAl)As Injection Lasers Operating with an Optical Fiber External Resonator", Conf. Integrated & Guided Wave Optics Tech. Digest, Incline Village, NV, U.S.A., Jan. 28-30, 1980.

*Primary Examiner*—William H. Punter
*Attorney, Agent, or Firm*—Robert F. Beers; Andrew M. Lesniak; Richard P. Lange

[57] ABSTRACT

An optical sensor has a gain medium situated at a first location and defines one end of a resonating optical cavity. An optical fiber couples electromagnetic radiation to a predetermined point at a second location where it is directed toward a reflective surface. The physical condition to be sensed causes the reflective surface to move with respect to the end of the optical fiber. This movement essentially changes the length of the cavity in which the electromagnetic energy is resonating causing a corresponding change in the axial mode difference frequency within the cavity. A small portion of electromagnetic energy is coupled out of the cavity at the first location to a photodetector. Finally, the photodetector creates an electrical signal which varies as the change in the axial mode difference frequency, thus indicating the change in the physical condition.

6 Claims, 3 Drawing Figures

CAVITY COUPLED OPTICAL CONDITION SENSOR

The Government has rights in this invention pursuant to Contract No. N00019-77-C-0080, awarded by the Department of the Navy.

This is a continuation-in-part application of U.S. application Ser. No. 138,623, filed Apr. 8, 1980, now abandoned.

TECHNICAL FIELD

The present invention relates to an optical instrument for measuring changes in a physical condition, and more particularly, to an optical device having a resonating cavity directly coupled through an optical fiber to a reflective surface, the displacement of which is indicative of the physical condition to be measured.

BACKGROUND ART

Position or displacement sensors are known generally and have been used for many years to measure the movement of a surface. Such a movable surface may be a part of a sensor of the type in which the amount of displacement reflects a variation in a physical condition, such as temperature, pressure, or the like. Often the precise location of the condition to be sensed is in a hostile environment of temprature extremes, or pressure extremes, or both. In such an environment many sensors do no have the ruggedness and durability for extended operation while maintaining a high degree of accuracy.

DISCLOSURE OF INVENTION

A primary object of the present invention is to provide a rugged and durable sensor which is highly accurate over its operating range, even though the location of the physical condition to be sensed is subject to extreme temperatures or pressures.

According to the present invention an optical sensor includes a resonating optical cavity which is coupled via an optical fiber to a reflective surface whose linear displacement is to be measured. Displacement of the mirror changes the length of the resonating cavity by an amount that is proportional to the variation in the distance separating the end surface of the fiber and the reflective surface.

A primary feature of the present invention involves the use of an optical resonating cavity having a portion which is of a fixed length and a portion which has a variable length. The laser drive and external cavity can be located in a benign environment while the site of the physical condition to be sensed may be hostile. Only light energy is coupled by an optical fiber to the reflective surface which varies as the physical condition of interest. The changes in the distance separating the reflective surface causes a proportional variation in the axial mode difference frequency of the resonating cavity, a condition that can be measured at the benign location.

An advatnage of the optical sensor of the present invention is that it can be used in environments subject to high electrical noise or where electricity at the sensor location can be a hazard, i.e., in a vapor filled tank. No electric power or electricity of any type need be located where the physical condition is sensed. Only light energy is transmitted to the sensor location. In addition, all of the components including the ones at the sensor location can be extremely small and fabricated from readily available but durable materials.

The foregoing and other objects, features and advantages will become more apparent from the following detailed description of a preferred embodiment as illustrated in the accompanying drawing.

BEST MODE FOR CARRYING OUT THE INVENTION

Figure 1:
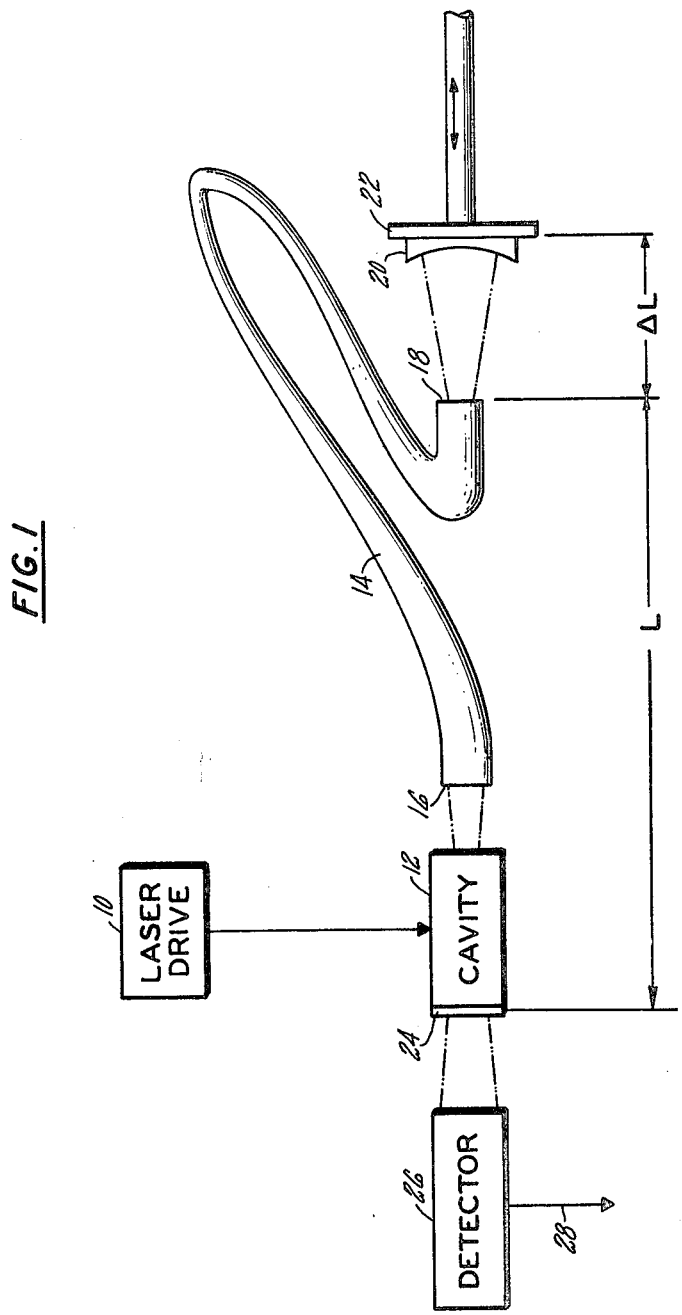
FIG. 1 is a simplified diagram depicting one embodiment of a cavity coupled condition sensor according to the present invention.

Referring initially to FIG. 1, there is seen one embodiment of the cavity coupled optical sensor according to the present invention. A laser drive 10, such as a lower diode, cooperates with an external cavity 12 to serve as an optical gain medium. A predetermined length of optical fiber 14 serves as an optical waveguide and includes an end face 16 positioned adjacent the cavity 12 to receive electromagnetic radiation from the gain medium. The optical fiber 14 extends from the location of the cavity to the location where the physical condition of interest is to be sensed. At this location the electromagnetic energy emerges from an end face 18 of the optical fiber 14 and is directed toward a reflective surface 20. The reflective surface 20 is positioned on a movable surface 22 whose deflection is in response to the condition of interest, which as position, pressure, temperature, or the like. As will be more apparent from the discussion hereinafter, movement of the reflective surface 20 with respect to the end face 18 of the optical fiber 14 causes a change in the axial mode difference frequency within the cavity, and this change is proportional to the movement of the reflective surface 20.

A particular feature of the cavity coupled optical sensor according to the present invention is that a dominating portion of an optical resonating cavity, this being at the outward end of the optical fiber 14, can be at a remote site in a hostime environment. By measuring the change in the resonating condition with the cavity at the benign end, an indiction of the amount of change in the physical condition at the hostile end can be derived. The resonating cavity is essentially defined at one end by the reflective surface 20 and extends through the optical fiber 14 and the cavity 12 to a mirror 24 which can be attached to the end of the external cavity. One embodiment for monitoring the resonating frequency in the cavity is by the use of a mirror 24 which is not totally reflective. In this case the mirror 24 would pass a small portion, such as one to two percent, of the electromagnetic energy impinging on its surface to a photodetector 26 which converts the light energy into an electrical signal at its output lead 28. This signal would then vary with the change in the axial mode difference frequency of the electromagnetic energy resonating throughout the length of the cavity, and hence the change in cavity length $\Delta L$.

An understanding of the theory of operation of a laser and optical resonating might well be helpful in appreciating the cavity coupled optical sensor according to the present invention. Reference is made to A. Siegman, *An Introduction To Lasers And Masers,* copyrighted 1971 by McGraw-Hill, particularly at pages 222-224 and 232-233. Light energy resonates throughout the cavity, and the length of the cavity is substantially defined by the reflective surface 20 at one end and the mirror 24 at the other end. The resonant frequency for the axial modes are thus expressed by the following equation.

$$\text{resonant frequency} = \beta \frac{C}{2(L + \Delta L)}$$

where

C is the velocity of light in free space,
$\beta$ is the number of half wavelength along the resonator axial (a large number),
L is the length of the optical cavity,
$\Delta L$ is the increase in length of the optical cavity due to the movement of the reflective surface 20.

These resonating frequencies are fairly closely spaced and are independent of one another. The basic condition is that the round-trip phase shift must be a multiple of $2\pi$ and the one-way phase shift is an integral multiple of $\pi$.

Figure 3:
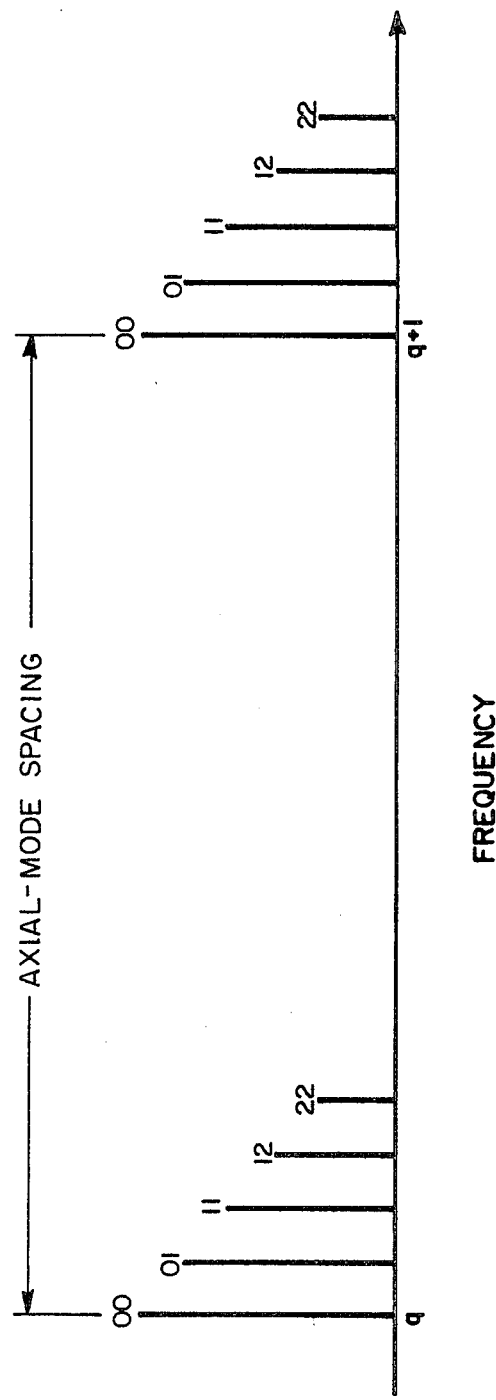
FIG. 3 is a graph depicting the resonant mode spectrum of an optical resonator.

Referring to FIG. 3, the relationship of the axial mode spacing in a frequency spectrum can be observed. The higher order (m,n) modes associated with a given $\beta$ value are shifted upward from the frequency of the axial mode of that $\beta$ in integral multiples of the axial mode spacing and lie on top of an axial mode of another higher $\beta$ value, while the antisymmetric (m,n) modes are shifted by one-half of the axial mode spacing and lie halfway between two higher order axial modes.

Figure 2:
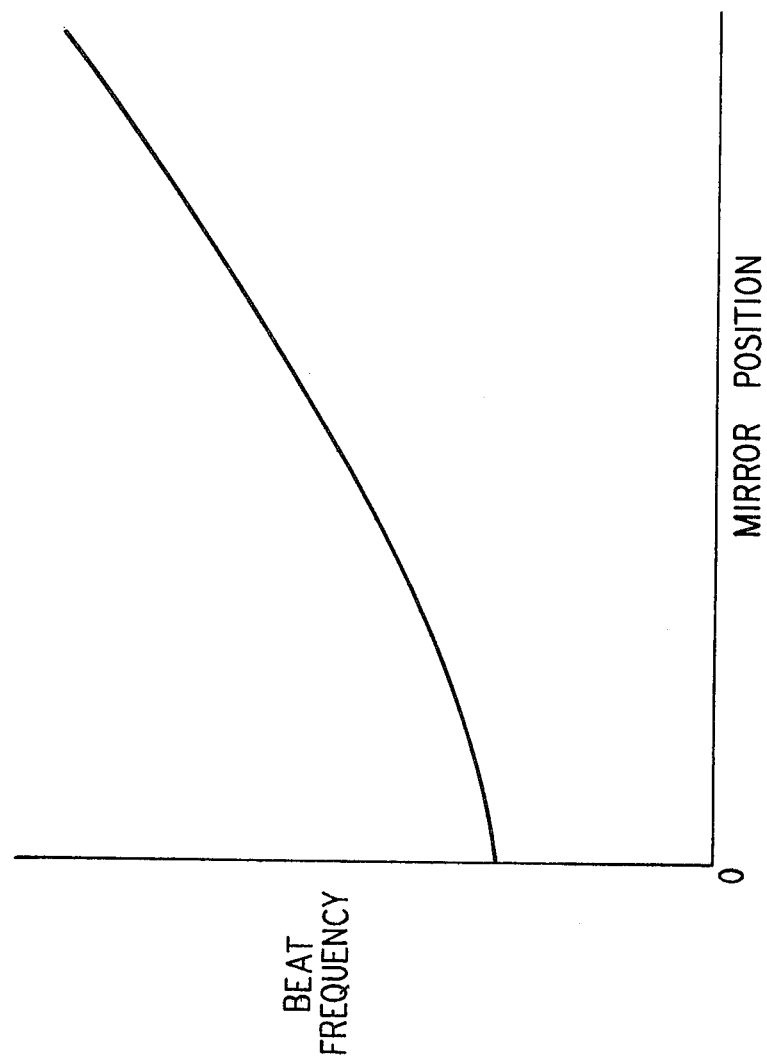
FIG. 2 is a graph depicting the change in axial mode difference frequency versus spacing of the reflective surface from the end of the optical fiber.

When a laser beam, such as from a cw gas laser, or broadband solid state laser, or equivalent, strikes the photodetector 26 (FIG. 1), the electrical output signal on the lead 28 will contain both a DC component proportional to the total intensity of the laser and also a beat frequency $\Delta f$, where $$\Delta f = \frac{C}{2(L + \Delta L)}$$

which $\Delta f$ is in FIG. 3 specified as the axial-mode spacing or heterodyne component related to the various axial difference frequencies. It is then this beat frequency that is related to the change in axial mode spacing and is utilized in the present invention as an indicia of the movement of the reflective surface 22. In fact, the absolute position of the reflective surface 22 is directly measurable by the axial mode difference frequency through the beat frequency. The graph shown in FIG. 2 is a plot of the position of reflective surface 20 with respect to the end face 18 of the optical fiber 14 as a function of the axial mode difference frequency.

A particular advantage of the optical sensor according to the present invention is that it has an extremely fast response time and is capable of high resolution over a wide range of sensed conditions. In addition, it provides a DC or direct reading of the change in the length of the cavity, rather than integrating the change as would be required by interferometric measurements. As will be appreciated, the length of the gain medium in the cavity 12 and the length of the portion of the resonating cavity through the optical fiber 14 to the location of the sensor is known for a particular embodiment. The distance from the end face 18 of the fiber 14 to the reflective surface 20 is essentially the only dimension that varies, and there is a single axial mode difference frequency associated with each position of the reflective surface 20 so that this direct correlation always exists but for minor changes due to aging, etc.

It should be understood that numerous modifications of this basic embodiment are possible without departing from the scope of the invention. For example, one or more lenses may be positioned between the external cavity 12 and the end face 16 of the optical fiber 14. Or, if desired, a lens could be used between the end face 18 at the other end of the optical fiber 14 and the reflective surface 20. The reflective surface 20 can also be positioned on the moving surface 22 by an assortment of known processes. A multitude of different lasers and gain mediums could be used as well as a number of different types of optical fibers depending upon such variables as bandwidth, the intensity of the coherent source, the length of the waveguide and the reflectivity of the surfaces defining the cavity. Single fibers or fiber bundles can be used as the optical fiber 14 depending on the particular application. A single mode fiber is desirable for a high degree of accuracy but it should be understood that a single mode fiber typically has sufficient bandwidth to pass at least two axial mode frequencies. If the sensed condition is in a hostile environment, the material from which the optical cable 14 and reflective surface 20 are made should be such that the hostile condition does not degrade the optical characteristics of the cable.

Although the invention has been shown and described with respect to a preferred embodiment thereof, those skilled in the art should understand that various changes and omissions of the form and detail thereof may be made without departing from the spirit and scope of the invention.

We claim:

1. An optical sensor for electrically measuring variations of a physical condition, comprising:

a coherent source of electromagnetic energy including an optical gain medium;

an optical waveguide in the form of at least one optical fiber of known length extending from the vicinity of said medium to transmit electromagnetic energy coming from said medium, there being essentially reflectionless coupling of said electromagnetic energy between said medium and said fiber;

reflective means in the vicinity of said fiber for reflecting electromagnetic energy exiting from said fiber back into said fiber upon operation of said coherent source of electromagnetic energy, said medium, fiber and reflective means forming at least two distinguishable axial mode frequencies which form a difference frequency, said reflective means and said fiber being in spaced relation with the distance between them varying in response to changes in said physical condition; and detector means coupled to said medium for creating an electrical signal that varies in proportion to changes in said difference frequency as caused by variation in said distance between said reflective means and said fiber; whereby changes in said physical condition cause corresponding changes in said distance from said reflective means to said fiber to produce proportional changes in said difference frequency and corresponding changes in said electrical signal.

2. A sensor according to claim 1 wherein said reflective means is a mirror.

3. A sensor according to claim 1, wherein a mirror, partially transmissive of electromagnetic energy for passing a small portion thereof, is positioned between said medium and said detector means.

4. A sensor according to claim 1, wherein said condition is the distance between said reflective means and said fiber.

5. A sensor according to claim 1, wherein said condition is pressure.

6. A sensor according to claim 1, wherein said condition is temperature.

* * * * *